(No Model.)
S. CURLIN.
DECOY.
No. 395,612. Patented Jan. 1, 1889.
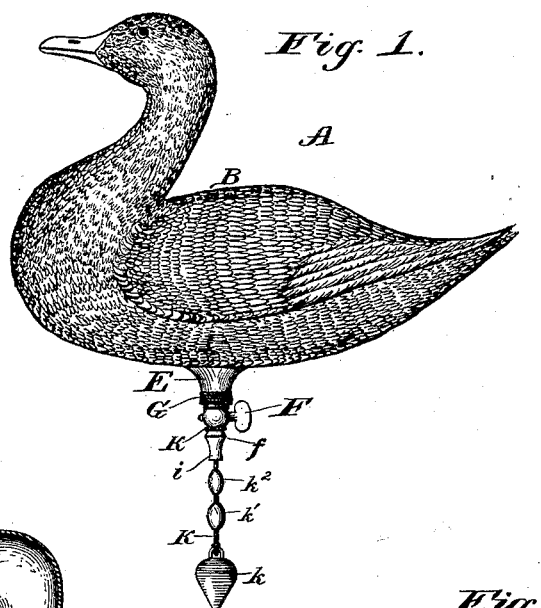
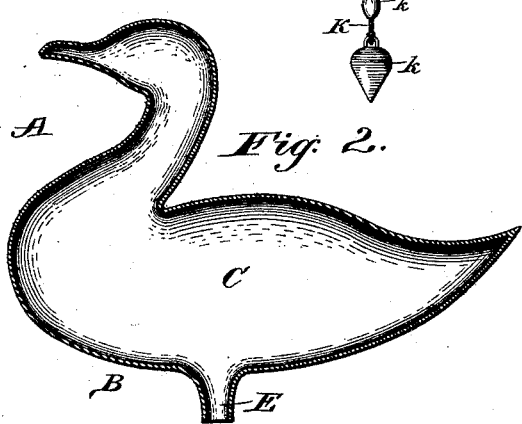
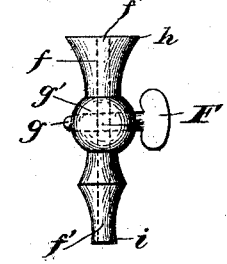
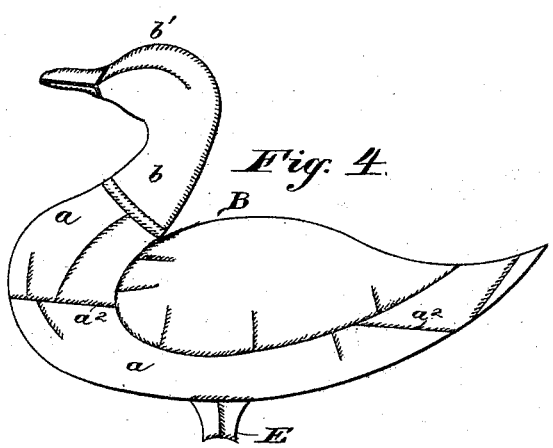
WITNESSES:
INVENTOR,
Seth Curlin
By Edson Bros.
Attorneys.

UNITED STATES PATENT OFFICE.

SETH CURLIN, OF UNION CITY, TENNESSEE.

DECOY.

SPECIFICATION forming part of Letters Patent No. 395,612, dated January 1, 1889.

Application filed October 17, 1888. Serial No. 288,327. (No model.)

*To all whom it may concern:*

Be it known that I, SETH CURLIN, a citizen of the United States, residing at Union City, in the county of Obion and State of Tennessee, have invented certain new and useful Improvements in Decoys; and I do hereby declare the following to be a full, clear, and exact description of the invention, such as will enable others skilled in the art to which it appertains to make and use the same.

My invention relates to improvements in decoys; and it consists of the peculiar construction and arrangement of parts, as will be hereinafter fully described and claimed.

The primary object of my invention is to provide an improved decoy which can be compactly folded and stored within a very narrow or small space, and which will be extremely simple and durable in construction and cheap of manufacture.

A further object of my invention is to provide means whereby the decoy may be readily inflated with air and the receiving or supply inlet effectually closed with ease, the air cock or valve also serving as a counter-weight to cause the decoy to at all times assume a proper vertical position. The air cock or valve is detachably secured in place to the inlet-nozzle, so that it can be readily removed to permit the body to be stuffed with a suitable light material, should the body of the decoy become broken or perforated through use and incapable of retaining air.

To enable others to understand my invention, I will now proceed to describe the same in connection with the accompanying drawings, in which—

Figure 1 is an elevation of my improved decoy. Fig. 2 is a vertical longitudinal sectional view thereof. Fig. 3 is an enlarged detached view of the air-valve; and Fig. 4 is a view of a decoy made of canvas, and before it is painted and finished.

Like letters of reference denote corresponding parts in all the figures.

In the drawings, A designates a decoy embodying my invention, which in the present instance I have shown as resembling a duck.

The body B of the decoy may be made of one or more pieces of rubber, or it may be made of canvas, as represented in Fig. 4. In this figure the body is made of two pieces, $a$ $a'$, of canvas or of other heavy water-proof material, which are cut after a suitable pattern and united together by sewing or other suitable means on the seams $a^2$, and the neck $b$ and head $b'$ are also made of similar material and sewed or united to the body. The body is made hollow, with an interior space or chamber, C, which is designed to receive air, or in case of leakage of the body it may be filled or stuffed with a suitable light material, as leaves, excelsior, &c., so as to distend the body and cause it to have a natural appearance. The body B is painted and finished on its exterior to give it a more life-like appearance and cause it to bear a close resemblance to the bird or other creature it is desired to imitate.

The body B of the decoy is provided on its lower side, at the middle thereof, with a depending nozzle, E, of a suitable size and material, the passage in which communicates with the space or chamber C in the body of the decoy, and in this nozzle is tightly fitted an air cock or valve, F. (Shown more clearly in Figs. 2 and 3.) This air valve or cock comprises a heavy metallic body, $f$, through which is made a longitudinal bore or passage, $f'$, and a turning plug, $g$, fitted tightly in a suitable seat, $g'$, in said body, so as to close or open the longitudinal bore or passage $f'$. The upper end of this metallic body $f$ is flared or enlarged, as shown at $h$, and it is fitted tightly in the open-ended depending nozzle E of the body B, a string or the like device, G, being securely tied around the nozzle and air-valve to more effectually obviate accidental separation of the air-valve from the nozzle. The lower end of the air-valve and the turning plug thereof are arranged below the nozzle E, so that said plug can be easily and readily manipulated; and the extreme lower end of the body $f$ of the air-valve is formed into a mouth-piece, $i$, so that the sportsman can readily inflate the decoy.

When the decoy is not in use, or it is desired to transport or pack the same, the turning plug is manipulated to permit the air therein to escape from the chamber C, and the body will then collapse and can be compactly folded within a narrow compass, which also admits of its being readily carried in the pocket. To inflate the decoy, the mouth-piece $i$ is applied to the lips and air is blown through the valve into the chamber C until the body B has been distended to the required extent, after which the turning plug is turned to cut off the escape of air from the chamber. The decoy is now in condition for use, and as it is very light and buoyant it will readily float on the surface of the water. The heavy metallic air-valve depending from the middle of the decoy serves as a counter-balance to the body and causes it to assume a proper upright position, and obviates the liability of the decoy being easily blown over.

Should the body of the decoy become perforated or leak after considerable use, or accidentally broken, the air-valve can be readily detached by removing the fastening-cord, and leaves, excelsior, or other like packing inserted in the body through the large mouth of the nozzle E, so as to stuff the decoy, and thereby adapt it for use for a much longer time.

It will be noted that when the decoy is in use the nozzle and air-valve are concealed or hid from view, as they are submerged in the water.

To submerge the decoy to the proper depth in the water, and thus prevent it from floating too high above the surface, which it is liable to do, owing to its buoyancy when filled with air, I have provided a series of interchangeable anchors, which are represented in Fig. 1 of the drawings. These anchors $g$ $g'$ $g^2$, of which I have represented three, are of different degrees of heaviness or weight and of different sizes, and they are all connected to a common line, G, which is secured at its upper end to the depending nozzle.

It is obvious that either of the anchors $g'$ or $g^2$ can be detached from the line G, should the decoy be submerged too much in the water, and when it floats too high above the surface that one or more of the anchors can be readily connected to the line to properly submerge the same.

I do not confine myself to any particular means for fastening the cord or line to the body of the decoy, nor to the means for connecting the anchors to the line, as I am aware that the connections can be made in numerous ways.

My improved decoy is a very great convenience over the ordinary decoys at present used, as it can be more conveniently carried, and it is also very strong, durable, and simple in construction and cheap of manufacture.

Having thus fully described my invention, what I claim as new, and desire to secure by Letters Patent, is—

1. A decoy comprising a buoyant collapsible body and a metallic air-valve depending from the middle of the body on the under side thereof, and having at an intermediate point of its length an exteriorly-accessible turning plug, the weight of said valve serving as a counter-balance to the buoyant body, substantially as and for the purpose set forth.

2. A decoy comprising a hollow collapsible body having at the middle of its under side a depending nozzle, E, made integral therewith, and a metallic air-valve detachably inserted in said nozzle and having a turning plug at a point below said nozzle, substantially as described.

3. A decoy comprising a hollow collapsible body having a nozzle depending from the under side thereof, a metallic air-valve having a flared upper end inserted in said nozzle, and a fastening for detachably connecting the air-valve to the nozzle, said air-valve also having a turning plug located in its longitudinal bore or passage $f'$ at a point below the nozzle and accessible at all times, substantially as described.

4. In a decoy, a buoyant body having means for inflating the same with air, a line connected to the body and having an anchor at its lower end for preventing dislodgment of said body, and a series of anchor-weights detachably connected to said line at suitable intervals to submerge the buoyant body to a greater or less degree, according to the number of anchor-weights employed, substantially as described.

In testimony whereof I affix my signature in presence of two witnesses.

SETH CURLIN.

Witnesses:
   I. H. DAVIS,
   A. J. LAWSON.